United States Patent [19]

Winslow et al.

[11] Patent Number: 5,071,805
[45] Date of Patent: Dec. 10, 1991

[54] CATALYST SYSTEM FOR HYDROTREATING HYDROCARBONS

[75] Inventors: Philip L. Winslow, Hercules; Richard F. Sullivan, San Rafael, both of Calif.

[73] Assignee: Chevron Research and Technology Company, San Francisco, Calif.

[21] Appl. No.: 592,240

[22] Filed: Oct. 3, 1990

Related U.S. Application Data

[62] Division of Ser. No. 349,848, May 10, 1989, Pat. No. 4,990,243.

[51] Int. Cl.$^5$ .................. B01J 29/06; B01J 35/00
[52] U.S. Cl. ............................. 502/66; 502/69
[58] Field of Search .................. 502/66, 69

[56] References Cited

U.S. PATENT DOCUMENTS

| | | | |
|---|---|---|---|
| 3,114,701 | 12/1963 | Jacobson et al. | 208/254 H |
| 3,184,403 | 5/1965 | Gardner | 208/254 H |
| 3,189,540 | 6/1965 | Kozlowski et al. | 208/254 H |
| 3,228,993 | 1/1966 | Kozlowski et al. | 208/254 H |
| 3,328,123 | 3/1966 | Voorhies, Jr. et al. | 208/254 H |
| 3,507,778 | 4/1970 | Gladrow et al. | 502/66 |
| 3,535,225 | 10/1970 | Jaffe | 502/69 |
| 3,558,525 | 1/1971 | Nobel | 502/66 |
| 3,793,190 | 2/1974 | Nastast et al. | 208/57 |
| 3,897,365 | 7/1975 | Feins et al. | 208/254 H |
| 3,923,638 | 12/1975 | Bertolacini et al. | 208/89 |
| 4,022,682 | 5/1977 | Bludiese et al. | 208/254 H |
| 4,210,521 | 7/1980 | Gorring et al. | 208/89 |
| 4,211,672 | 7/1980 | Sonetaka et al. | 252/455 R |
| 4,221,677 | 9/1980 | Vasalos et al. | 252/455 Z |
| 4,255,282 | 3/1981 | Simpson | 208/254 H |
| 4,325,808 | 4/1982 | Kim et al. | 208/65 |
| 4,363,719 | 12/1982 | Bousquet et al. | 208/111 |
| 4,534,852 | 8/1985 | Washacheck et al. | 208/89 |
| 4,657,663 | 4/1987 | Gardner | 208/254 H |
| 4,680,280 | 7/1987 | Pandey et al. | 502/66 |
| 4,761,220 | 8/1988 | Beret et al. | 208/59 |
| 4,797,195 | 1/1989 | Kukes et al. | 208/59 |
| 4,797,196 | 1/1989 | Kukes et al. | 208/59 |
| 4,875,991 | 10/1989 | Kukes et al. | 502/69 |

FOREIGN PATENT DOCUMENTS 2073770  10/1981  United Kingdom .

OTHER PUBLICATIONS

International Search Report in CT/US90/02581 dated Sep. 14, 1990.

*Primary Examiner*—Carl F. Dees
*Attorney, Agent, or Firm*—Burns, Doane, Swecker and Mathis

[57] ABSTRACT

This invention provides a layered catalyst system for hydro-denitrification of hydrocarbons, such as vacuum gas oil, used for hydrocracking to produce various fuels. The layered catalyst system of this invention comprises a first layer of a nickel-molybdenum-phosphorus-/alumina catalyst or a cobalt-molybdenum-phosphorus-/alumina catalyst and a second layer catalyst comprising a nickel-tungsten/silica-alumina-zeolite or a nickel-molybdenum/silica-alumina-zeolite catalyst. The preferred aspects of the combination of the layered catalysts disclosed herein are: (a) the first layer alumina catalyst has a molybdenum content greater than about 14% by wt.; (b) the first layer alumina catalyst has a relatively large pore size, such as at least about 60 Å; and (c) the second layer catalyst contains at least about 2% of a zeolite component. The layered catalyst system of this invention and the attendant process produces improved denitrification of feedstocks, improved catalyst life and other advantages.

11 Claims, No Drawings

5,071,805

CATALYST SYSTEM FOR HYDROTREATING HYDROCARBONS

This application is a divisional of application Ser. No. 07/349,848, filed May 10, 1989, now U.S. Pat. No. 4,990,243.

BACKGROUND OF THE INVENTION

This invention relates to catalyst systems and processes for hydrotreating hydrocarbons by contacting the hydrocarbon with hydrogen in the presence of an appropriate catalyst. An aspect of hydrotreating which is of particular interest in this invention is denitrification in connection with hydrocracking.

Denitrification of hydrocarbon streams in petroleum refining is particularly important relative to hydrocracking in order to lower the nitrogen content of the feed stream to an acceptable level before subjecting the hydrocarbon feed stream to the complete hydrocracking process. In general, it is desirable to reduce the nitrogen content of the hydrocarbon feed stream to less than 10 parts per million by weight (ppm), preferably less than about 2 ppm and in many cases for increased catalyst life it is important to have the nitrogen content reduced to a level of less than 0.5 ppm.

Hydrodenitrification catalysts which have been used have various disadvantages, which include a tendency to foul with coke or other contamination at an excessive rate, which results in shorter catalyst life than is desired. As the catalyst fouls or deactivates, the denitrification process temperature must be increased to maintain activity. When the maximum temperature allowed by process and equipment limitations is reached, the catalyst must be replaced or regenerated.

Hydrotreating catalysts of various compositions are known in the art. For example, nickel-molybdneum and similar catalysts are disclosed in U.S. Pat. Nos. 4,210,521; 4,363,719; 4,534,852 and U.K. Application No. 2,073,770, the disclosures of which are incorporated herein by reference However, none of these prior disclosures addresses the problems of catalyst activity and catalyst life in a way which is relevant to the present invention.

It is the object of this invention to provide a denitrification catalyst system which has increased activity, increased operating life and thereby improved economics for hydrotreating processes. The increased life of the denitrification catalysts is desirably provided by reducing the tendency for coking and improving the tolerance of the catalysts for poisons as well as improving the diffusion of hydrocarbons in the catalysts. Other objects of this invention will be apparent from the description herein.

SUMMARY OF THE INVENTION

In one aspect this invention provides a layered catalyst system for hydrotreating hydrocarbons comprising a first layer of a catalyst which comprises a nickel-molybdenum-phosphorus/alumina catalyst or a cobalt-molybdenum-phosphorus/alumina catalyst having a molybdenum content greater than about 14% by weight of the first layer catalyst and having an average pore size of at least about 60Å and comprising a second layer of a catalyst which comprises a nickel-tungsten/silica-alumina-zeolite or a nickel-molybdenum/silica-alumina-zeolite catalyst, wherein the zeolite component comprises at least about 2% by weight of the second layer catalyst.

Among the various advantages of this invention, it has surprisingly been found that, when the layered catalyst is employed in hydrodenitrification processes, this combination of catalyst layers produces improved denitrification, improved catalyst life, and consequently improved economics for denitrification. In addition, it has been found that the layered catalyst of the present invention is less exothermic and can therefore be operated at a more uniform temperature. It is, therefore, easier to operate and control than previous catalysts. Consequently, an additional advantage is that hot spots do not occur as readily in the layered catalyst of the present invention compared to other catalysts. The avoidance of hot spots provides the operating advantage of avoiding to a significant degree the coking of the catalyst, which is caused at least in part by hot spots in the catalyst bed. Lower levels and/or rates of coking of the catalyst contribute to increased catalyst life of the layered catalyst of the present invention.

In the first layer of the catalyst, i.e., the nickel-molybdenum-phosphorus/alumina catalyst or cobalt-molybdenum-phosphorus/alumina catalyst, it has been found advantageous to use a relatively large pore size. It is believed that the larger pore size contributes to improved tolerance towards poisons and improved resistence to coking. A preferred catalyst for the first layer is a nickel-molybdenum-phosphorus/alumina catalyst.

An important aspect of the layered catalyst system of the present invention is that the second layer contains a zeolite component. The second layer of the catalyst may be nickel-tungsten or nickel-molybdenum and it is preferred that the second layer of the catalyst contain a silica-titania-alumina-matrix together with the zeolite component.

It is believed that the unique features and advantages of the layered catalyst system of this invention result in part from the fact that the first layer is a more active catalyst for denitrification reactions, but does not induce significant cracking activity. On the other hand, the second layer catalyst is more acidic and has higher cracking activity which results in the effective conversion of the refractory nitrogen compounds not converted in the first layer catalyst. Therefore, the resulting combination of the two layers of catalyst according to the present invention, produces surprisingly improved and superior results compared to previously known hydrodentrification catalyst systems.

In another aspect, this invention is a process for hydrotreating of hydrocarbons comprising contacting the hydrocarbon with hydrogen in the presence of a layered catalyst system comprising a first layer of a catalyst which comprises a nickel-molydenum-phosphorus/alumina catalyst or a cobalt-molybdenum-phosphorus/alumina catalyst having a molybdenum content greater than about 14% by weight of the first layer catalyst and having an average pore size of at least 60Å and comprising a second layer of a catalyst which comprises a nickel-tungsten/silica-alumina-zeolite or a nickel-molybdenum/silica-alumina-zeolite, wherein the zeolite component comprises at least about 2% by weight of the second layer catalyst. The process of this invention provides advantageous operating conditions which include lowered operating temperatures for extended periods of time. This is in part made possible by the improved tolerance of the catalyst system to poisoning and the resistance of the catalyst to coking, which enables the operation of the process at lower temperatures for longer catalyst life periods.

DESCRIPTION OF THE INVENTION

This invention is directed to layered catalysts and in a preferred aspect relates in particular to compositions which provide improved operating efficiency and catalyst life for hydrodenitrification of hydrocarbons having a boiling range of about 650° F. to about 1000° F., such as vacuum gas oils. However, other feed stocks or hydrocarbon streams may be treated with the layered catalyst system of this invention under suitable conditions to provide desired hydroprocessing or hydrodenitrification of those feed stocks or streams. It has unexpectedly been found that the layered catalyst system of this invention results in numerous advantages which are primarily manifested in increased catalyst life and activity.

The invention is based in part on the first layer of the catalyst system being a nickel-molybdenum-phosphorus/alumina catalyst or cobalt-molybdenum-phosphorus/alumina having at least about 14% by weight molybdenum and a relatively large average pore size or diameter. The pore size should be at least about 60Å, preferably at least about 70Å, and more preferably at least about 75Å. A preferred range of average pore size is from about 75Å to about 120Å. As used herein, the pore size is the pore size conventionally referred to in an alumina containing catalyst. The measurement and determination of the pore size in metal-alumina catalyst is well known in the art, as illustrated in "Adsorption, Surface Area, and Porosity" by S. J. Greg and K. S. W. Sing (Academic Press, 1982). The alumina is preferably a gamma alumina. The catalysts useful in this first layer are commercially available catalysts which are relatively inexpensive. The low acidity alumina surface is believed to provide a surface which generates less fouling by coking. The large average pore size is believed to make a catalyst less sensitive to fouling by coking. The reduced coking and reduced sensitivity to coking are two of the factors which contribute to the improved catalyst life exhibited by the catalyst system of this invention.

In the first layer of the catalyst system, it is preferred to have Ni and/or Co present in the range of about 2 to about 7 wt. %, more preferably about 3%, Mo present in the range of about 14 to about 18 wt. %, more preferably about 15–17%, and P present in the range of about 1 to about 5 wt. %, more preferably about 3%. These percentages as used herein are % by weight of metal content in the oxide form of catalyst (although the metals are actually present in the catalyst composition in the form of oxides) and are the % by weight based on the weight of the catalyst before sulfiding.

The catalyst in the second layer of the catalyst system of this invention comprises a nickel-tungsten/silica-alumina-zeolite catalyst or a nickel-molybdenum/silica-alumina-zeolite catalyst, either of which may be a preferred silica-titania-alumina-zeolite type catalyst. The zeolite component of the catalyst should comprise at least about 2% of by weight of the second layer catalyst, preferably at least about 3% by weight, and more preferably in the range of about 3% to about 20% by weight. A most preferred catalyst for the second layer of the catalyst system of this invention contains about 4% by weight zeolite component. The % by weight of zeolite in the second layer catalyst as expressed herein is based on the weight of the second layer catalyst before sulfiding. In this second layer catalyst it is preferred to have the Ni present in the range of about 2 to about 10 wt. %, more preferably about 7 wt. %, W present in the range of about 15 to about 25 wt. %, more preferably about 20 wt. %, Mo present in the range of about 12 to about 18 wt. %, more preferably about 15 to about 17 wt. %, and Ti present in the range of about 2 to about 10 wt.%, preferably about 4 wt. %.

The zeolite component in the second layer catalyst is a Y-type zeolite, such as Na-USY, USY or LZ-20. These zeolites are well known in the art and described in "Zeolite Molecular Sieves, Structure, Chemistry, and Use" by D. W. Breck (John Wiley & Sons, N.Y., 1984).

The silica-alumina-zeolite catalyst of the second layer of the catalyst system of this invention is prepared by conventional methods for preparing catalysts which contain an amorphous silica-alumina component and a crystaline zeolite component. While cogell methods of catalyst preparation are preferred for making the silica-alumina-zeolite catalyst for the second layer, other conventional methods of incorporating silica-alumina into the catalyst may be used.

The first layer of the catalyst system will constitute up to about 70 vol. %, preferably from about 20 to about 70 vol. %, and more preferably from about 40 to about 60 vol. %, based on the total weight of the two layers of catalyst system of this invention. Consequently, the second layer will be at least about 30 vol. %, preferably from about 30 to about 80 vol. %, and more preferably from about 40 to about 60 vol. %, of the total layered catalyst system.

The layered catalyst system of this invention is prepared by placing the first layer nickel-molybdenum-phosphorus/alumina catalyst or the cobalt-molybdenum-phosporus/alumina catalyst in a first top-most catalyst bed area of a vessel and placing the second layer catalyst containing the zeolite component in a second bottom-most or downstream bed area of the vessel. Thereby, the process is adapted to contact the hydrocarbon feedstock with the first layer of catalyst and then with the second layer of catalyst in sequence and in the presence of hydrogen. In this configuration the liquid and gas contact the catalyst by flowing downward in the reactor vessel.

When charging catalysts to the reactor, all metals are nominally present as the following oxides:

| Metal | Corresponding Metal Oxide |
|-------|---------------------------|
| Ni    | NiO                       |
| Mo    | $MoO_3$                   |
| P     | $P_2O_5$                  |
| W     | $WO_3$                    |
| Ti    | $TiO_2$                   |
| Al    | $Al_2O_3$                 |
| Si    | $SiO_2$                   |

The catalyst system of this invention is sulfided using conventional sulfiding methods after charging to the reactor.

The feedstock which can be treated with the catalyst system and process of the present invention can contain up to about 6000 ppm nitrogen, but preferably the nitrogen content of the feed stock will be in the range of about 500 to about 3000 ppm nitrogen. The process of this invention employing the catalyst system of this invention is normally conducted at a liquid hourly space velocity in the range of about 0.4 to about 4 and preferably about 0.7 to about 2. The process is typically conducted in a temperature range of about 650° F. to about 800° F., preferably in the range of about 700° F. to about 800° F. and more preferably from about 720° F. to about 760° F. The pressure for the efficient operation of the process of the present invention should be in the range of about 1000 to about 3000 psig, preferably in the range of about 1200 to about 2500 and more preferably in the range of about 1500 psig to about 2200 psig. The inlet rate of hydrogen relative to that of oil should be in the range of about 3500-8000 SCFB, preferably about 4500-6500 SCFB. (SCFB=standard cubic feet of feed hydrogen per barrel of oil feed.) It has been found that using these conditions and the above feedstocks, the catalyst system and the process of this invention will produce a hydrotreated product which will have a nitrogen content less than about 10 ppm, more typically less than about 2 ppm and will generally have less than about 0.5 ppm nitrogen.

In determining the desirable characteristics of a hydrodenitrification catalyst, one important characteristic is the rate at which the catalyst fouls or, conversely, the rate at which the catalyst activity decreases. With decreasing activity of the catalyst, the process operating temperature must be increased in order to maintain the conversion which is desired in the process. The temperature can be increased until the operational limits are reached, which may be the operational limits imposed by the catalyst system itself, the particular feedstock and the conversion products desired therefrom, or the temperature limitations of the process equipment being used. Thus, one important criterion for judging the performance of a catalyst system is the rate of activity loss. Obviously, the lower the rate of activity loss in a catalyst having the desired activity, the more economical the catalyst will be to operate, because fewer catalyst changes and/or regeneration cycles are required.

Having described the catalyst system and process of the present invention in general terms, the invention can be illustrated by the following examples, which are merely specific exemplary embodiments of the present invention. The following examples and specific embodiments are not to be used to construe the scope of the present invention, which is defined by the claims appended hereto.

EXAMPLES

In the following examples, one of the first layer catalysts, "Catalyst A", which was used was a commercially available nickel-molybdenum-phosphorus supported on alumina ("Shell 411" available from Shell Oil Company, Houston, TX.), which had the following general specifications:

| Catalyst A | |
|---|---|
| 2.6 wt % | nickel |
| 14.3 wt % | molybdenum |
| 2.9 wt % | phosphorus |
| remainder | alumina |
| 165 m²/g | surface area |
| 0.43 cc/g | pore volume |
| 104 Å | average pore diameter |

Another catalyst used for the first layer is "Catalyst B" having the following general specifications:

| Catalyst B | |
|---|---|
| 3.7 wt % | nickel |
| 13.2 wt % | molybdenum |
| 2.2 wt % | phosphorus |
| remainder | alumina |
| 173 m²/g | surface area |
| 0.43 cc/g | pore volume |
| 99 Å | average pore diameter |

Catalyst B is prepared as follows:
1. 400 g of Kaiser Versal 250 alumina and 600 g of catapal alumina are charged to a mixer.
2. 20 g of 70% nitric acid is added to the alumina with sufficient water to raise the volatiles level of the resulting paste to 55%.
3. The paste is mixed for 30 minutes, then extruded through a 0.07" die.
4. The resulting noodles are then dried at 250° F. for 2 hours and 400° F. for 2 hours.
5. The resulting extrudates are then calcined at 1400° F. for 4 hours.
6. A solution of nickel in phosphomolybdic acid was prepared as follows:
a solution is prepared from: 38.5 g phosphomolybdic acid 6.4 g of 85% $H_3PO_4$ enough water to bring to 30cc;
10.6 g of $NiCO_3$ is added to this solution;
5 drops of 30% hydogen peroxide is added; and
water added to bring to final volume of 65cc.
7. Solution from Step 6 is sprayed onto 100 g of extrudates from Step 5.
8. The wet extrudates are dried at 200° F. for 4 hours.
9. The dried extrudates are calcined at 950° F. for 5 hours in 10 CFH dry air.

Another catalyst used for the first layer was "Catalyst C", a commercially available catalyst ("Ketjen KF843" catalyst from AKZO Chemicals, Inc., Pasadena, TX.), which had the following general specifications.

| Catalyst C | |
|---|---|
| 3.3 wt % | nickel |
| 16.7 wt % | molybdenum |
| 3.1 wt % | phosphorus |
| remainder | alumina |
| 162 m²/g | surface area |
| 0.37 cc/g | pore volume |
| 91 Å | average pore diameter |

The catalyst used for the second layer, "Catalyst D", was a cogeled nickel-tungsten/silica-alumina-titania-zeolite catalyst prepared by methods of U.S. Pat. No. 3,536,605. The general specifications of the second layer Catalyst D are:

| Catalyst D | |
|---|---|
| 7.1 wt % | nickel |
| 19.4 wt % | tungsten |
| 4.6 wt % | titanium |
| 25.9 wt % | silica |
| 28.9 wt % | alumina |
| 4.0 wt % | Na-USY zeolite |
| 270 m²/g | surface area |
| 0.39 oc/g | pore volume |
| 58 Å | average pore diameter |

The feedstock used in the tests was a blend of 70% North Slope vacuum gas oil and 30% San Joaquin Valley vacuum gas oil, having 20.7 API, 0.78 wt. % percent sulfur, 2400 ppm nitrogen and the following D1160 distillation:

| LV % | °F. |
|---|---|
| Start | 490 |
| 5 | 590 |
| 10 | 643 |
| 30 | 721 |
| 50 | 764 |
| 70 | 798 |
| 90 | 848 |
| 95 | 877 |
| End | 913 |
| Recovery | 98 |

For each test a total of 130cc of catalyst was charged to a reactor having a 2.54 cm I.D. and thus providing a total catalyst bed 30.48 cm in length. In the following examples, the designated catalysts contained the following amounts of each catalyst:

| non-layered | 130 cc of a single catalyst |
|---|---|
| 45%/55% | 58.5 cc first layer |
| | 71.5 cc second layer |
| 75%/25% | 97.5 cc first layer |
| | 32.5 cc second layer |

After the catalysts were charged to the reactor, the catalysts were sulfided as follows, using dimethyl disulfide (DMDS): 1.0 LHSV of a solution containing 2.0 wt % DMDS in normal heptane with 8.0 SCFH hydrogen between 450°–600° F. for 9 hours.

EXAMPLE 1

The operating conditions in this example included psig, 5500 SCFB once through hydrogen, 1.5 LHSV and temperature level to achieve 5.0 ppm nitrogen in the product. The results were as follows:

| | Non-layered Catalyst A | Non-layered Catalyst D | Layered Catalyst 45% A/55% D |
|---|---|---|---|
| Temperature required to reach 5.0 ppm product nitrogen after 250 hours (°F.) | 746 | 753 | 739 |

The layered catalyst system of Catalyst A/Catalyst D produced the desired nitrogen level at a significantly lower temperature than either catalyst alone.

EXAMPLE 2

In this example, the operating conditions were psig, 5500 SCFB once through hydrogen, 1.5 LHSV and temperature level to achieve 5.0 ppm nitrogen in the product. The results were as follows:

| | Non-Layered Catalyst D | Layered Catalyst 45% C/55% D |
|---|---|---|
| Temperature required to reach 5.0 ppm product nitrogen (°F.) | 768 | 760 |
| Relative Rate of Activity Loss | 1.0 | 0.86 |

The layered catalyst system of Catalyst C/Catalyst D produced the desired nitrogen level at a significantly lower temperature than Catalyst D alone, and had a lower relative rate of activity loss.

EXAMPLE 3

In this example, the conditions were 1600 psig, 5500 SCFB once through hydrogen, 1.5 LHSV and temperature level to achieve 5.0 ppm nitrogen in the product. The results were are as follows:

| | Non-Layered Catalyst D | Layered Catalyst 45% B/55% D |
|---|---|---|
| Temperature required to reach 5.0 ppm product nitrogen (°F.) | 768 | 758 |
| Relative Rate of Activity Loss | 1.0 | 2.2 |

Use of Catalyst B layered over Catalyst D did not improve performance over that of Catalyst D alone. This example demonstrates the importance of having a molybdenum content in the first layer catalyst greater than about 14%

EXAMPLE 4

In this example, the conditions were 1600 psig, 5500 SCFB once through hydrogen, 1.5 LHSV and temperature maintained at a level to achieve 5.0 ppm nitrogen in the product. Results were as follows:

| | Non-Layered Catalyst D | Layered Catalyst 75% C/25% D |
|---|---|---|
| Temperature required to reach 5.0 ppm product nitrogen (°F.) | 768 | 754 |
| Relative Rate of Activity Loss | 1.0 | 2.1 |

This example illustrates that if the second layer catalyst amount is about 25% or less of the catalyst charge to the reactor, then a significant increase in relative rate of activity loss is observed. A non-layered system of all Catalyst C would have a relative rate of activity loss 5 to 10 times higher than the non-layered Catalyst D.

The present invention is described above and illustrated with the above specific embodiments in the form of examples. Now the scope and spirit of this invention is set forth in the following claims.

We claim:

1. A layered catalyst for hydroprocessing of hydrocarbons, comprising:
  (a) a first layer of a catalyst which comprises a catalyst selected from the group consisting of a nickel-molybdenum-phosphorus/alumina and a cobalt-molybdenum-phosphorus/alumina, said first layer catalyst having a molybdenum content greater than about 14% by weight of the first layer catalyst and having an average pore size of at least about 60Å; and
  (b) a second layer of a catalyst which comprises a catalyst selected from the group consisting of a nickel-tungsten/silica-alumina-zeolite and a nickel-molybdenum/silica-alumina-zeolite, said second layer catalyst having a zeolite content of at least about 2% by weight of the second layer catalyst.

2. A catalyst system according to claim 1 wherein the first layer catalyst comprises a nickel-molybdenum-phosphorous/alumina catalyst.

3. A catalyst system according to claim 1 wherein the second layer catalyst further comprises a titanium oxide.

4. A catalyst system according to claim 3 wherein the first layer catalyst comprises a gamma alumina having an average pore size of at least about 70Å.

5. A catalyst system according to claim 3 wherein the second layer catalyst zeolite component comprises from about 3 to about 20% by weight of the second layer catalyst.

6. A catalyst system according to claim 4 wherein the second layer catalyst zeolite component comprises from about 3 to about 20% by weight of the second layer catalyst.

7. A catalyst system according to claim 1 wherein the first layer catalyst has an average pore size from about 75 to about 120Å.

8. A catalyst system according to claim 2 wherein the first layer catalyst has an average pore size from about 75 to about 120Å.

9. A catalyst system according to claim 3 wherein the first layer catalyst has an average pore size from about 75 to about 120Å.

10. A catalyst system according to claim 6 wherein the first layer catalyst has an average pore size from about 75 to about 120Å.

11. A catalyst system according to claim 1 wherein the catalyst is presulfided.

* * * * *